United States Patent [19]

Marek

[11] Patent Number: 5,353,638
[45] Date of Patent: Oct. 11, 1994

[54] PROCESS FOR MANUFACTURING MICRO-MECHANICAL SENSORS

[75] Inventor: Jiri Marek, Reutlingen, Fed. Rep. of Germany

[73] Assignee: Robert Bosch GmbH, Stuttgart, Fed. Rep. of Germany

[21] Appl. No.: 930,703

[22] PCT Filed: Mar. 23, 1991

[86] PCT No.: PCT/DE91/00260
§ 371 Date: Sep. 30, 1992
§ 102(e) Date: Sep. 30, 1992

[87] PCT Pub. No.: WO91/16604
PCT Pub. Date: Oct. 31, 1991

[30] Foreign Application Priority Data

Apr. 14, 1990 [DE] Fed. Rep. of Germany ........ 4012080

[51] Int. Cl.$^5$ .................. G01F 1/68; H01L 21/306; B44C 1/22
[52] U.S. Cl. .................. 73/204.26; 156/633; 156/657
[58] Field of Search ........... 73/204.22, 204.23, 204.25, 73/204.26; 136/633, 657

[56] References Cited

U.S. PATENT DOCUMENTS

| | | | |
|---|---|---|---|
| 4,478,077 | 10/1984 | Bohrer et al. | 73/204 |
| 4,548,078 | 10/1985 | Bohrer et al. | 73/204.22 |
| 4,581,928 | 4/1986 | Johnson | 73/204 |
| 4,668,333 | 5/1987 | Tandon et al. | 156/657 |
| 4,698,131 | 10/1987 | Araghi et al. | 156/633 |
| 4,784,721 | 11/1988 | Holmen et al. | 156/647 |
| 4,822,755 | 4/1989 | Hawkins et al. | 437/227 |
| 4,829,818 | 5/1989 | Bohrer | 73/204.22 |
| 4,867,842 | 9/1989 | Bohrer et al. | 156/647 |
| 4,888,988 | 12/1989 | Lee et al. | 73/204 |
| 4,909,078 | 3/1989 | Sittler et al. | 73/204 |
| 4,961,821 | 10/1990 | Drake et al. | 156/647 |
| 4,975,143 | 12/1990 | Drake et al. | 156/657 |

*Primary Examiner*—Herbert Goldstein
*Attorney, Agent, or Firm*—Frishauf, Holtz, Goodman & Woodward

[57] ABSTRACT

A method for constructing a sensor, in particular an air mass sensor, is proposed, where at least one sensor element is structured from a wafer. The sensor element is separated from the wafer and placed on a substrate. In the course of structuring the sensor element by means of anisotropic etching, the outwardly located edges of the sensor element are simultaneously anisotropically etched, so that the sensor element is only connected with the wafer from which it has been structured by thin bridges, which are cut for separating the sensor element. By means of anisotropic etching an opening is made in a second wafer, which has a size corresponding to the geometric dimensions of the sensor element. To construct the sensor, the sensor element is inserted into the opening of the second wafer.

9 Claims, 2 Drawing Sheets

PROCESS FOR MANUFACTURING MICRO-MECHANICAL SENSORS

STATE OF THE ART

The invention relates to a method for constructing a micromechanical sensor.

In connection with customary methods, the sensors formed out of a wafer are separated from the wafer by sawing. The lateral boundary walls of the sensor elements being created in the course of this are oriented perpendicular to the wafer surface. Assembly of micromechanical sensor elements takes place by gluing, soldering or glass-sealing on a substrate, depending on the nature and the material of the sensor element and substrate. The electrical connections for the sensor elements are bonded to metal strips located on the exterior.

ADVANTAGES OF THE INVENTION

The method in accordance with the invention has the advantage that the sensor element is already essentially separated from the wafer by means of anisotropic etching during the structuring process, except for bridges, which maintain the sensor element in a defined position during the manufacturing process. In this connection, it is advantageous that the lateral boundary walls of the sensor element being created form defined angles in respect to the wafer surface, depending on the crystal orientation of the wafer, and are very smooth. Also, an essential advantage of the method lies in the opportunity to perform structuring of the sensor elements, for example by membrane etching, in the same process step.

A second wafer is structured in such a way that an opening is created into which the sensor element fits exactly. The exactness required for creating the dimensions of the sensor element and the opening can be attained in a particularly simple manner with silicon wafers of the same crystal orientation by anisotropic etching, because the crystallographic actualities can be advantageously used in the course of this. For some uses it is particularly advantageous to place the sensor element in the opening of the second wafer in such a way that a homogeneous surface is created, which does not have steps in the transition from the sensor element to the second wafer. This is attained in an advantageous manner in that the sensor element is structured out of a first wafer, which has the same thickness as the second wafer, from which the opening is structured. If the opening extends completely through the second wafer and if the sensor element has the same thickness as the wafer, it is easy to realize a homogeneous surface in a simple manner by means of providing appropriate longitudinal and width dimensions. This method can be used particularly advantageously in connection with the manufacture of micromechanical air mass sensors. In this case, homogeneous laminar flow over the sensor surface is required. Steps, even in the range of some 10 $\mu$m, create turbulence which has disruptive effects on the measuring signal. It is possible with the aid of the assembly method in accordance with the invention to produce a sensor surface having the required homogeneity.

DRAWINGS

Exemplary embodiments of the invention are illustrated in the drawings and explained in detail in the following description.

DESCRIPTION OF THE EXEMPLARY EMBODIMENT

Figure 1:
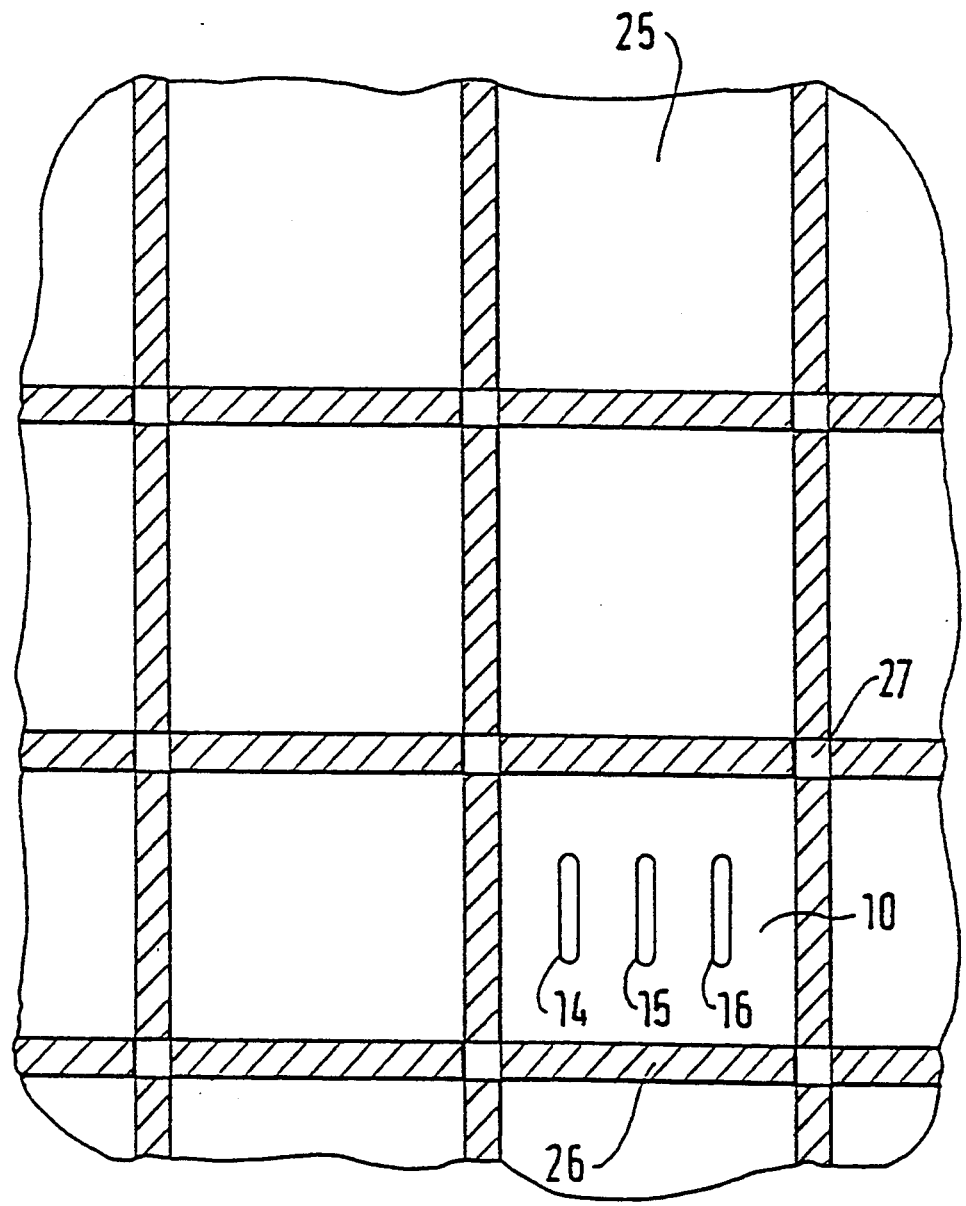
FIG. 1 shows a top view of a wafer section following structuring.

In FIG. 1, a wafer is designated by 25, from which sensor elements 10 of the same type have been structured, on which the electronic switching elements have been placed and one of which will be described below by way of example. The sensor element 10 has three resistors 14, 15 and 16 on its surface, which will be described in detail in the course of the description of FIG. 2. When using crystals with (100)- or (110)-crystal orientation, it is possible to create the structures common in micromechanics, such as paddles, tongues or diaphragms, advantageously by means of anisotropic electrochemical etching. Because the manufacture of chips containing electronic switching elements entail very high costs, it is attempted to produce as many chips as possible from one wafer in the course of processing, i.e. to keep the chips as small as possible. The method of the invention permits a reduction in the size of the sensor elements even below the functionally-dictated dimensions, however, exact definition of the lateral walls of the sensor elements is required for this. For this reason the separation of the sensor element 10 from the wafer 25 and the remaining sensor elements is not made by sawing or breaking off, but in two steps: in the course of the anisotropic chemical etching process for structuring the sensor element 10, the lateral boundary walls of the sensor element 10 are also etched, so that an etched ditch 26 is created, which passes completely through the wafer 25 so that the sensor element 10 is only connected by thin bridges 27 with the wafer 25 and the other sensor elements. The bridges assure a defined position of the sensor elements during processing. The bridges are severed for the final separation of the sensor elements, which can take place, for example, by sawing or breaking off. In the course of anisotropic etching of the lateral boundary walls of the sensor element 10, the angles between the lateral walls defined by etching and the wafer surface, characteristic for the crystal orientation of the wafer 25, are automatically formed in addition to very smooth surfaces.

Figure 2:
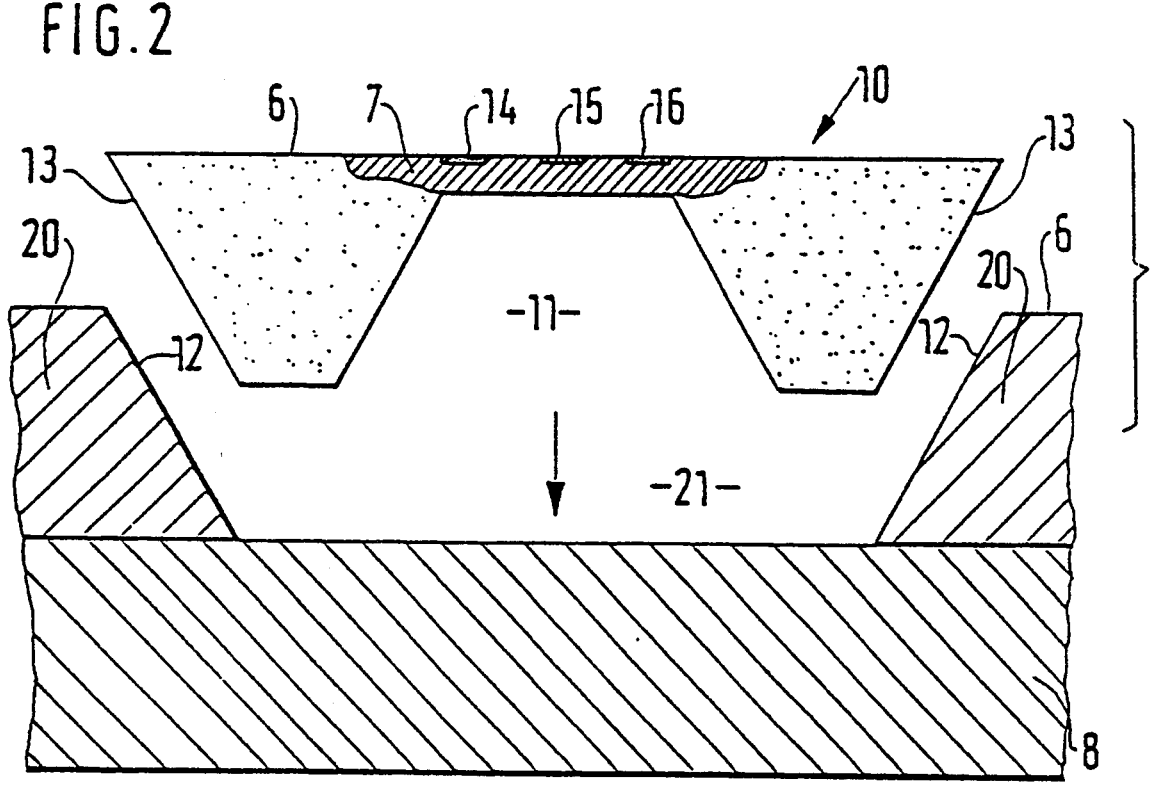
FIG. 2 shows a section through a structured wafer prior to insertion of a sensor element.

A sensor for measuring gas or air masses, which can be advantageously constructed in accordance with the method of the invention, is shown in cross section in FIG. 2. A sensor element, which has been structured from a wafer 25 shown in FIG. 1, is designated by 10. The sensor element 10 has three resistors 14, 15 and 16 on its surface 6, of which at least two are temperature-dependent. The at least two resistors 14 and 16 can be heated, in this example by means of the resistor 15 which heats the material surrounding it. The thickness of the sensor element 10 in the area of the resistors 14, 15 and 16 has been reduced to keep the thermal mass of the surroundings of the resistor 15 as small as possible, because of which a cavern 11 was created. The sensor element 10 is intended to be fitted into an opening 21 of a wafer 20, which has been indicated by the arrow. The opening 21 passes completely through the wafer 20 and is of such size that the sensor element 10 exactly fits into it on at least two opposite flanks 13 and that in this direction no steps occur in the surface 6 at the transition between the sensor element 10 and the wafer 20. The wafer 20 has been placed on a substrate 8. This can be, for example, a ceramic or metallic substrate.

The wafer 20 shown in this example has the same crystal orientation as the sensor element 10. Since not only the opening 21 but also the lateral boundary walls of the sensor element 10 were created by anisotropic etching, the flanks 12 of the opening 21 and the flanks 13 of the sensor element 10 have the same defined steepness. Furthermore, 7 designates doping used as an etching stop, which prevents the etching from penetrating through the sensor element in the area of the cavern 11.

The mode of operation of the air mass sensor shown in FIGS. 2 and 3 can be explained as follows: a laminar air or gas flow, which is as homogeneous as possible, is conducted over the surface 6 with the resistors 14, 15 and 16. Because of heat transport by the gas, a temperature gradient is created at the resistors 14, 15 and 16, which causes a change in the resistance values of the resistors 14, 15 and 16 and which can be evaluated. An extremely homogeneous sensor surface 6 is required to prevent turbulence, which would make the interpretation of the measurement signal more difficult.

Figure 3:
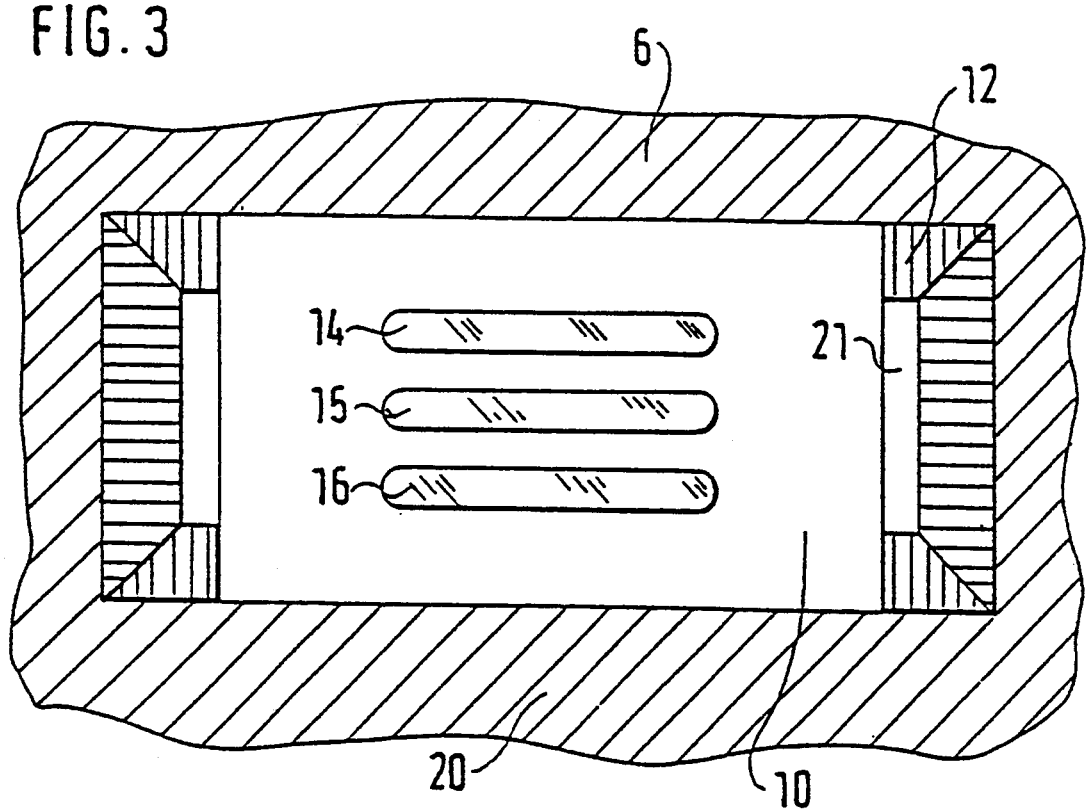
FIG. 3 is a top view of a sensor.

The sensor surface 6 with the wafer 20, the sensor element 10 and the resistors 14, 15 and 16 is shown in FIG. 3. The sensor surface must have a defined minimum size to assure a laminar flow over the sensor surface 10. This can be attained in a cost-effective manner with the method of the invention by means of the structured wafer 20, which is used as a frame for the actual sensor element. A large sensor surface is attained by the insertion into the wafer 20, in spite of a small and thus cost-effective sensor element. In this example the sensor element 10 has been fitted into the wafer 20 in such a way, that it borders exactly against the wafer 20 with only two opposite edges, so that no turbulences are generated by unevenness of the sensor surface 6 in a gas flow which is conducted over the sensor perpendicularly in respect to these edges. The resistors 14, 15 and 16 are accordingly disposed one behind the other in this direction.

I claim:

1. A method of making an air mass sensor, comprising the steps of:
   forming a first (25) and a second (20) monocrystalline silicon wafer, each having an upper and a lower major surface, parallel to each other;
   doping a plurality of regions (7) of said first wafer (25), adjacent its upper major surface (6), to define etch stops;
   anisotropically etching the lower major surface of said first wafer (25) to thereby form an almost continous trough (26) surrounding each doped region (7) and to define respective individual sensor elements (10) interconnected by bridges (27), and further etching a central cavity (11) under each doped region (7) to define a relatively thin, thermally responsive portion;
   forming a plurality of resistor elements (14, 15, 16) on said thermally responsive portion of each individual sensor element (10);
   anisotropically etching the upper major surface of said second wafer (20) to define a plurality of recesses (21), each having lateral dimensions matching dimensions of each sensor element (10), and sidewalls (12) whose inclination matches an inclination of sidewalls (13) of each sensor element (10);
   mounting said second wafer (20) on a substrate (8); and
   inserting each sensor element (10) into one of said recesses (21) until said upper major surface (6) of said sensor element is co-planar with the upper major surface of said second wafer.

2. A method in accordance with claim 1, characterized in that
   the sensor element (10) has the same thickness as the second wafer (20) and that the wafer (20) is completely etched through in the course of etching out the opening (21).

3. A method in accordance with claim 1 characterized in that
   the sensor element (10) is inserted into the opening (21) of the wafer (20) in such a way that a level surface (6) is created.

4. A method in accordance with claim 1 characterized in that
   silicon wafers with (100)-crystal orientation or (110)-crystal orientation are used as first wafer (25) and second wafer (20).

5. A sensor for measuring air flow comprising
   a central thin, thermally responsive region (7) of monocrystalline semiconductor material;
   a heating resistor (15) on said thermally responsive region;
   at least one sensing resistor (14, 16) on said thermally responsive region;
   a thicker supporting element of semiconductor material surrounding said thermally responsive region (7) and having inclined sidewalls (13);
   a further semiconductor element (20) surrounding said thicker supporting element and having sidewalls (12) inclined at an angle complementary to inclination of said sidewalls (13) of said thicker supporting element and an upper surface co-planar with upper surfaces (6) of said thermally responsive region (7) and of said thicker supporting element; and
   a substrate (8) secured to a lower major surface of said further semiconductor element (20).

6. A sensor in accordance with claim 5, characterized in that
   at least one temperature-dependent resistor (14, 15, 16) is disposed on the surface (6) of the sensor element (10).

7. A sensor in accordance with claim 6, characterized in that
   means for heating the at least one resistor (14, 15, 16) are provided.

8. A sensor in accordance with claim 6, characterized in that
   means for evaluating the resistance change in the at least one resistor (14, 15, 16) are provided.

9. A sensor in accordance with one of claim 5, characterized in that
   the thickness of the sensor element (1) has been reduced in the area where the at least one resistor (14, 15, 16) is disposed.

* * * * *